Figure 1:
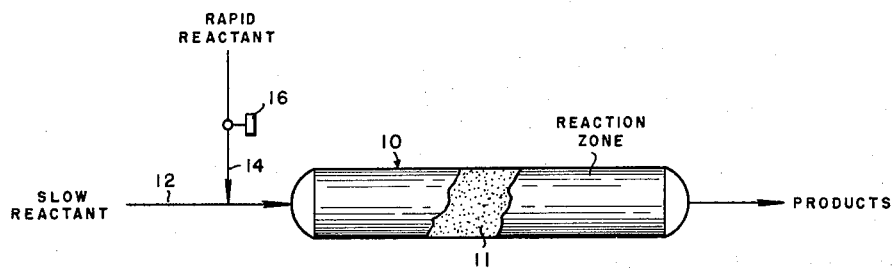

Sept. 1, 1964 E. M. MAGEE 3,147,078
METHOD FOR CONDUCTING A VAPOR PHASE CATALYTIC REACTION
BETWEEN A PLURALITY OF VAPORIZED REACTANTS
DIFFERING IN RATE OF TRAVEL
Filed Aug. 20, 1958

*INVENTOR.*
ELLINGTON M. MAGEE,

BY

ATTORNEY.

United States Patent Office 3,147,078
Patented Sept. 1, 1964

3,147,078
METHOD FOR CONDUCTING A VAPOR PHASE CATALYTIC REACTION BETWEEN A PLURALITY OF VAPORIZED REACTANTS DIFFERING IN RATE OF TRAVEL
Ellington M. Magee, Baytown, Tex., assignor, by mesne assignments, to Esso Research and Engineering Company, Elizabeth, N.J., a corporation of Delaware
Filed Aug. 20, 1958, Ser. No. 756,223
4 Claims. (Cl. 23—204)

This invention relates to an improved method for conducting a catalytic conversion operation. More particularly, this invention relates to an improved method for conducting a catalytic conversion process in order to maximize the formation of desired conversion products.

In conducting catalytic liquid or vapor phase conversion processes involving a plurality of reactants, a limitation in reaction efficiency is frequently imposd by the catalytic equilibrium which is established during the course of the catalytic treating operation, by the thermodynamics of the desired reaction, by catalytically or thermally promoted side reactions, etc.

In copending Dinwiddie application Ser. No. 714,097, filed February 10, 1958, and entitled "Catalytic Process," there is disclosed a process wherein a fluent carrier is continually passed through a bed of finely divided solid conversion catalyst and wherein a fluent feed stock to be reacted is periodically introduced into the carrier gas in the form of discrete pulses in order to provide continuous fractionation of at least a portion of the components of the reaction during the course of travel of such reaction components through the elongate catalyst bed.

This process suffers from a disadvantage when a plurality of reactants must be charged to the catalyst in that differences in the rate of travel of the reactants will result in separation of the reactants whereby the desired reaction may be partially or even completely inhibited.

In accordance with the present invention, these and related problems are overcome through the provision of a process wherein there is charged to an elongate bed of finely divided catalyst a first reactant having a known flow rate and wherein pulses of a reactant having a significantly different (e.g., faster) flow rate are periodically injected into the slower moving reactant whereby the reactants may be maintained in continual contact with each other and whereby, in addition, at least partial continuous fractionation of the products and by-products of the reaction will occur. This, in turn, results in substantial improvements in yield.

Among the catalytic conversion operations employing plural components which may be conducted in accordance with the present invention are reactions such as the catalytic conversion of carbon dioxide to carbon monoxide in the presence of hydrogen, the catalytic conversion of hydrogen chloride to chlorine in the presence of oxygen, the catalytic partial oxidation of benzene or naphthalene, etc.

The catalyst to be employed in a particular situation will, of course, be a catalyst which will suitably promote the desired reaction. The catalyst should be in a finely divided condition and may have, for example, a particle size within the range of 3 to 60 mesh.

Numerous examples of suitable conversion processes which may be conducted in accordance with the present invention will suggest themselves to those skilled in the art. By way of example, suitable conversion processes may be found in the text, "Principles of Organic Chemistry," by Enslish and Cassidy.

The relatively slower moving reactant which is continually introduced (hereinafter referred to as the slow reactant) should be in the same state as the intermittently introduced reactant. Thus, the reactants should all be initially in the vapor phase or should all be initially in liquid phase.

The particulate catalyst is arranged within an elongate conversion zone and the slow reactant is continuously flowed therethrough whereas the fast reactant is periodically introduced. The desired conversion conditions of temperature and pressure are maintained within the conversion zone with appropriate auxiliary equipment such as pumps, preheaters, heat exchangers, etc. The rate of flow of the reactants (feed material) through the conversion zone and the length of the conversion zone should be sufficient to provide for a feed material contact time sufficient to provide for the desired degree of conversion and sufficient to permit at least partial fractionation of at least one component of the reaction mixture during passage through the conversion zone.

The time interval between feed injections should be correlated with conversion zone length and carrier flow rate in order that the slower moving components of an initial pulse of reactants are not substantially overtaken by, and thus substantially admixed with, the faster moving components of the next following pulse of reactants.

Numerous advantages are obtained with the process of the present invention. The advantages are particularly pronounced in the case of conversion operations wherein a reversible chemical equilibrium limits the degree of formation of a desired conversion product, for in this situation it is possible through the provision of the process of the present invention to continuously maintain a constantly changing chemical equilibrium in the conversion zone whereby, for a given set of conversion conditions, the effective equilibrium is "shifted to the right." Accordingly, for a constant set of conversion conditions a greater rate of net conversion may be obtained or, conversely, for a given degree of conversion, milder operating conditions may be employed to thereby inhibit or even suppress undesired side reactions.

Figure 2:
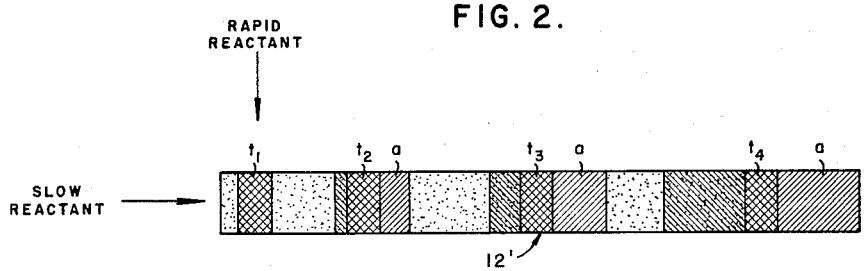

The invention will be further illustrated in connection with the accompanying drawing wherein:

FIG. 1 is a schematic flow sheet illustrating, generally, the manner in which the present invention is practiced; and FIG. 2 is a schematic showing of the manner in which a disturbed equilibrium is continuously maintained in accordance with the present invention.

Turning now to FIG. 1, there is schematically disclosed a reaction zone 10 containing a bed of finely divided solid contacting agent 11. A flowing stream of a slow reactant is continually introduced into the reaction zone 10 by way of a charge line 12. The fast reactant is periodically introduced by means of a charge line 14 controlled by a time actuated valve 16. As a consequence, pulses of the fast reactant are periodically injected into the flowing stream of slow reactant. Each pulse of fast reactant, on entering the reaction zone 10, is brought into catalytic contact with the finely divided catalyst in the presence of the slow reactant whereby the desired chemical reaction will be initiated. Since the fast reactant will continuously pass through unreacted components of the slow reactant, the two materials will continuously be in contact with each other in the presence of the catalyst. In addition, however, reaction components having a rate of travel different from the rate of travel of the feed components will be continuously at least partially separated from the feed components on travel through the elongate catalyst zone. As a consequence, the reaction products will be continuously physically at least partially separated from one another as they are evolved whereby a constantly changing (e.g., disturbed) chemical equilibrium will be continuously maintained. As a consequence, the effective equilibrium will be "shifted to the right" whereby the efficiency of conversion will be substantially enhanced.

This is schematically shown in FIG. 2. With reference to FIG. 2, a slow reactant is continuously introduced into the reaction zone and is continuously passed in contact with the stationary catalyst and passes through the reaction zone as shown by the dotted portion, while a pulse of fast reactant, on entering the reaction zone 10, will react with the moving stream of the slow reactant to form an initial equilibrium composition at an instant of time $t_1$ as shown by the double crosshatch area. The hatched area shown lagging behind the double crosshatch represents reaction products having a slower rate of travel than the fast reactant and which would also be separated from the reaction zone to disturb the equilibrium. At a subsequent period of time $t_2$, a lighter reaction component "a" formed during an interval of time $t_2-t_1$ will have become physically separated from other components. As a consequence, further reaction of the feed stock components will occur during the period of time $t_2-t_1$ with the further formation of component "a." Consequently, at periods of time $t_3$, $t_4$, etc., progressively larger amounts of component "a" will have been separated from the feed stock components whereby a disturbed equilibrium will be continuously maintained. Thus, it is seen that by introducing the fast reactant in pulses separated by a sufficient passage of time to prevent the admixture of the fast reactant with the lagging products of a prior pulse, a separation of the reactant and reaction product is obtained which continually disturbs the equilibrium and allows a shifting of the reaction to the right of the equilibrium formula, whereby the net product will be increased.

The invention will be further illustrated by the following specific examples which are given by way of illustration and not intended as limitations on the scope of this invention.

Example I

A stainless steel reactor having a length of about 10 feet and a diameter of about ¼ inch is filled with a particulate catalyst having a particle diameter within the range from about 30 to 60 mesh, such catalyst being proportioned so as to provide 100 parts of iron and 1 part of ceria per 100 parts of kieselguhr.

Hydrogen is heated to a temperature of about 1100° F. and continuously flowed through the reactor at a velocity of about 9.3 cubic centimeters of hydrogen per gram of catalyst per hour. Carbon dioxide is intermittently charged to the reactor in equal bursts at intervals such that the average flow of the carbon dioxide is about 3.7 cubic centimeters per gram of catalyst per hour. As a consequence, the average flow of hydrogen and carbon dioxide through the reactor is about 13 cubic centimeters of reactants per gram of catalyst per hour.

During passage of the hydrogen and carbon dioxide through the reactor, a reversible reaction between the hydrogen and carbon dioxide occurs, resulting in the formation of water and carbon monoxide. At least partial separation of the water and carbon monoxide from the carbon dioxide occurs whereby there is obtained about an 80 percent conversion of the carbon dioxide to carbon monoxide.

By way of contrast, when a mixture of 5 parts of hydrogen with about 1 part of carbon dioxide is prepared and the mixture is continuously flowed through the reactor at a rate of about 13 cubic centimeters of reaction mixture per gram of catalyst per hour at 1100° F., only about 45 percent of the carbon dioxide is converted to carbon monoxide.

Example II

A stainless steel reactor having a length of about 10 feet and a diameter of about ¼ inch is packed with a catalyst prepared by saturating 40 to 60 mesh pumice stone with cuprous chloride (CuCl). Air is heated to a temperature of about 840° F. and continuously flowed through the reactor at the rate of about 30 cubic centimeters per minute. Hydrogen chloride is injected into the flowing stream of air in plugs (i.e., pulses) having a volume of about 0.1 cubic centimeter at 5 minute intervals.

As a result, reaction of the hydrogen chloride with the oxygen is initiated in accordance with a reversible reaction resulting in the formation of chlorine and water. At least partial separation of the chlorine and water from the hydrogen chloride is effected, as shown by the conversion of in excess of about 95 percent of the hydrogen chloride to chlorine.

By way of contrast, when a mixture of hydrogen chloride with oxygen is prepared and when the mixture is flowed through the reactor at a flow rate of about 30 ccs. per minute at the indicated temperature, only about 70 percent conversion of the hydrogen chloride to chlorine is obtained.

Having described my invention, what is claimed is:

1. A method for conducting a vapor phase catalytic chemical conversion reaction between a plurality of vaporized feed materials in an elongate conversion zone in the presence of a bed of finely divided catalytically active solid particles which comprises continuously introducing into said elongate catalyst zone under conversion conditions a first reactant having a rate of travel through said bed of finely divided catalytically active solid particles under said conversion conditions which is less than the rate of travel of a second reactant, periodically introducing pulses of said second reactant into said conversion zone whereby a chemical reaction between said first and second reactants will be initiated in the presence of said catalyst and whereby at least partial separation of the ensuing reaction products from said second reactant will occur as said reactants flow through said conversion zone, and thereafter recovering the products of said reaction, said periods of time between introduction of pulses of said second reactant being sufficient to prevent products formed as a result of the introduction of each pulse from intermingling with the products formed by the introduction of the next succeeding pulse.

2. A method as in claim 1 wherein the catalyst is a ceria promoted iron catalyst supported on kieselguhr, wherein the first reactant is hydrogen, wherein the second reactant is carbon dioxide, and wherein the reaction products are water and carbon monoxide.

3. A method as in claim 1 wherein the catalyst is a supported cuprous chloride catalyst, wherein the first reactant is oxygen, wherein the second reactant is hydrogen chloride, and wherein the reaction products comprise chlorine and water.

4. A method for conducting a reversible vapor phase catalytic chemical reaction between a plurality of vaporized feed material in an elongated conversion zone, utilizing a bed of finely divided catalytically active solid particles, which comprises continuously introducing into said conversion zone a first reactant having a rate of travel through said bed of solid particles which is less than the rate of travel of a second reactant, introducing said second reactant into said conversion zone in pulses separated by sufficient time to prevent the intermingling of the products formed as a result of the introduction of one pulse with the products or reactants of a succeeding pulse, withdrawing the conversion product from said zone, and recovering said product of reaction.

References Cited in the file of this patent

UNITED STATES PATENTS

| | | |
|---|---|---|
| 1,719,867 | Arsem | July 9, 1929 |
| 2,312,952 | Balcar | Mar. 2, 1943 |
| 2,418,931 | Gorin | Apr. 15, 1947 |
| 2,451,870 | Richardson et al. | Oct. 19, 1948 |
| 2,514,282 | Holder | July 4, 1950 |
| 2,593,232 | Watson | Apr. 15, 1952 |

FOREIGN PATENTS

| | | |
|---|---|---|
| 304,343 | Great Britain | Jan. 17, 1929 |